(12) United States Patent
Jain et al.

(10) Patent No.: US 9,112,715 B2
(45) Date of Patent: Aug. 18, 2015

(54) METHOD AND SYSTEM FOR INTELLIGENTLY FORWARDING MULTICAST PACKETS

(75) Inventors: Nitin Jain, Saratoga, CA (US); Lee Chen, Saratoga, CA (US); Earl Ferguson, Los Altos Hills, CA (US); Min Zhu, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 113 days.

(21) Appl. No.: 12/765,765

(22) Filed: Apr. 22, 2010

(65) Prior Publication Data

US 2010/0238927 A1     Sep. 23, 2010

Related U.S. Application Data

(60) Division of application No. 12/152,617, filed on May 14, 2008, now Pat. No. 7,877,508, which is a continuation of application No. 09/982,106, filed on Oct. 19, 2001, now Pat. No. 7,389,359.

(51) Int. Cl.
*H04L 12/18* (2006.01)

(52) U.S. Cl.
CPC .................................. *H04L 12/1886* (2013.01)

(58) Field of Classification Search
None
See application file for complete search history.

(56) References Cited

U.S. PATENT DOCUMENTS

| | | |
|---|---|---|
| 4,379,950 A | 4/1983 | Ahmed |
| 4,488,288 A | 12/1984 | Turner |
| 4,491,945 A | 1/1985 | Turner |
| 4,627,052 A | 12/1986 | Hoare et al. |
| 4,677,588 A | 6/1987 | Benjamin et al. |
| 4,679,189 A | 7/1987 | Olson et al. |
| 4,688,170 A | 8/1987 | Waite et al. |
| 4,706,081 A | 11/1987 | Hart et al. |

(Continued)

FOREIGN PATENT DOCUMENTS

| | | |
|---|---|---|
| GB | 2268376 | 1/1994 |
| WO | 96/34474 | 10/1996 |

OTHER PUBLICATIONS

Notice of Allowance in U.S. Appl. No. 12/152,617, mailed Oct. 14, 2010.

(Continued)

*Primary Examiner* — Wei Zhao
*Assistant Examiner* — Ronald h Davis
(74) *Attorney, Agent, or Firm* — Fountainhead Law Group P.C.

(57) ABSTRACT

A routing system utilizes a layer 2 switch interconnecting several routers to intelligently forward multicast packets throughout an interne exchange carrying multicast content. The layer 2 switch performs protocol snooping to extract a lookup key that is based on network layer protocol information. The lookup key is uniquely formulated to support either shared or explicit source distribution trees. The lookup key is used to query a forwarding memory that returns an outgoing port index. The outgoing port index points to one or more outgoing ports that are eligible to receive the multicast packet. The outgoing ports are also connected to the neighboring device(s) that are designated to receive the multicast packet. The routing system also supports real time maintenance and updating of the forwarding memory based on the periodic exchange of control messages. The routing system is configured to support PIM routers operating in PIM SM or PIM SSM modes. However, the routing system can also support other multicast protocols and/or standards.

18 Claims, 3 Drawing Sheets

(56) References Cited

U.S. PATENT DOCUMENTS

| | | | |
|---|---|---|---|
| 4,720,950 A | 1/1988 | Bayer et al. | |
| 4,734,907 A | 3/1988 | Turner | |
| 4,755,992 A | 7/1988 | Albal | |
| 4,757,497 A | 7/1988 | Beierle et al. | |
| 4,779,092 A | 10/1988 | Takao | |
| 4,797,881 A | 1/1989 | Ben-Artzi | |
| 4,831,620 A | 5/1989 | Conway et al. | |
| 4,864,559 A | 9/1989 | Perlman | |
| 4,894,822 A | 1/1990 | Buhrke et al. | |
| 4,897,841 A | 1/1990 | Gang | |
| 4,933,938 A | 6/1990 | Sheehy | |
| 4,935,926 A | 6/1990 | Herman | |
| 4,939,726 A | 7/1990 | Flammer et al. | |
| 4,947,390 A | 8/1990 | Sheehy | |
| 5,018,137 A | 5/1991 | Backes et al. | |
| 5,079,767 A | 1/1992 | Perlman | |
| 5,081,623 A | 1/1992 | Ainscow | |
| 5,086,426 A | 2/1992 | Tsukakoshi et al. | |
| 5,088,032 A | 2/1992 | Bosack | |
| 5,088,090 A | 2/1992 | Yacoby | |
| 5,095,480 A | 3/1992 | Fenner | |
| 5,109,483 A | 4/1992 | Baratz et al. | |
| 5,136,580 A | 8/1992 | Videlock et al. | |
| 5,136,716 A | 8/1992 | Harvey et al. | |
| 5,142,622 A | 8/1992 | Owens | |
| 5,226,039 A | 7/1993 | Frank et al. | |
| 5,235,595 A | 8/1993 | O'Dowd | |
| 5,249,292 A | 9/1993 | Chiappa | |
| 5,251,205 A | 10/1993 | Callon et al. | |
| 5,289,460 A | 2/1994 | Drake, Jr. et al. | |
| 5,301,303 A | 4/1994 | Abraham et al. | |
| 5,309,437 A | 5/1994 | Perlman et al. | |
| 5,321,691 A * | 6/1994 | Pashan | 370/395.7 |
| 5,331,637 A | 7/1994 | Francis et al. | |
| 5,349,674 A | 9/1994 | Calvert et al. | |
| 5,355,371 A | 10/1994 | Auerbach et al. | |
| 5,355,375 A | 10/1994 | Christensen | |
| 5,361,256 A | 11/1994 | Doeringer et al. | |
| 5,394,402 A | 2/1995 | Ross | |
| 5,396,493 A | 3/1995 | Sugiyama | |
| 5,400,326 A | 3/1995 | Smith | |
| 5,428,615 A | 6/1995 | Backes et al. | |
| 5,430,727 A | 7/1995 | Callon | |
| 5,434,855 A | 7/1995 | Perlman et al. | |
| 5,444,702 A | 8/1995 | Burnett et al. | |
| 5,448,565 A | 9/1995 | Chang et al. | |
| 5,481,540 A | 1/1996 | Huang | |
| 5,485,455 A | 1/1996 | Dobbins et al. | |
| 5,491,694 A | 2/1996 | Oliver et al. | |
| 5,500,860 A | 3/1996 | Perlman et al. | |
| 5,511,168 A | 4/1996 | Perlman et al. | |
| 5,517,494 A | 5/1996 | Green | |
| 5,517,620 A | 5/1996 | Hashimoto et al. | |
| 5,521,910 A | 5/1996 | Matthews | |
| 5,530,703 A | 6/1996 | Liu et al. | |
| 5,530,842 A | 6/1996 | Abraham et al. | |
| 5,550,816 A | 8/1996 | Hardwick et al. | |
| 5,557,745 A | 9/1996 | Perlman et al. | |
| 5,559,883 A | 9/1996 | Williams | |
| 5,583,861 A | 12/1996 | Holden | |
| 5,608,726 A | 3/1997 | Virgile | |
| 5,634,011 A | 5/1997 | Auerbach et al. | |
| 5,790,554 A | 8/1998 | Pitcher et al. | |
| 5,892,910 A | 4/1999 | Safadi | |
| 5,898,686 A | 4/1999 | Virgile | |
| 5,920,566 A | 7/1999 | Hendel et al. | |
| 5,938,736 A | 8/1999 | Muller et al. | |
| 5,959,989 A | 9/1999 | Gleeson et al. | |
| 6,018,771 A | 1/2000 | Hayden | |
| 6,044,400 A | 3/2000 | Golan et al. | |
| 6,094,435 A | 7/2000 | Hoffman et al. | |
| 6,104,713 A * | 8/2000 | Nagami et al. | 370/392 |
| 6,111,874 A | 8/2000 | Kerstein | |
| 6,122,669 A | 9/2000 | Crayford | |
| 6,128,665 A | 10/2000 | Iturralde | |
| 6,147,995 A | 11/2000 | Dobbins et al. | |
| 6,216,167 B1 * | 4/2001 | Momirov | 709/238 |
| 6,226,686 B1 | 5/2001 | Rothschild et al. | |
| 6,233,618 B1 | 5/2001 | Shannon | |
| 6,301,257 B1 | 10/2001 | Johnson et al. | |
| 6,331,983 B1 * | 12/2001 | Haggerty et al. | 370/400 |
| 6,539,022 B1 | 3/2003 | Virgile | |
| 6,553,028 B1 * | 4/2003 | Tang et al. | 370/389 |
| 6,560,236 B1 | 5/2003 | Varghese et al. | |
| 6,563,830 B1 * | 5/2003 | Gershon et al. | 370/395.53 |
| 6,606,706 B1 | 8/2003 | Li | |
| 6,711,172 B1 * | 3/2004 | Li | 370/401 |
| 6,772,222 B1 * | 8/2004 | Gallo et al. | 709/238 |
| 6,839,348 B2 | 1/2005 | Tang et al. | |
| 6,847,638 B1 * | 1/2005 | Wu et al. | 370/389 |
| 6,963,575 B1 * | 11/2005 | Sistanizadeh et al. | 370/404 |
| 6,977,891 B1 * | 12/2005 | Ranjan et al. | 370/229 |
| 7,065,079 B1 * | 6/2006 | Patra et al. | 370/390 |
| 7,116,640 B2 * | 10/2006 | Tasman et al. | 370/252 |
| 7,877,508 B1 | 1/2011 | Jain et al. | |
| 2001/0034793 A1 | 10/2001 | Madruga et al. | |
| 2003/0165140 A1 * | 9/2003 | Tang et al. | 370/393 |

OTHER PUBLICATIONS

IEEE Std. 802.1D-2004 IEEE Standard for Local and metropolitan area networks, Media Access Control (MAC) Bridges.

Cain, B., Deering, S., Kouvelas, I., Fenner, B., and A. Thyagarajan, "Internet Group Management Protocol, Version 3," RFC 3376, Oct. 2002.

Fujisawa, K. and A. Onoe, "Transmission of IPv6 Packets over IEEE 1394 Networks," RFC 3146, Oct. 2001.

Crawford, M., "Transmission of IPv6 Packets over Ethernet Networks," RFC 2464, Dec. 1998.

Crawford, M., "Transmission of IPv6 Packets over FDDI Networks," RFC 2467, Dec. 1998.

Crawford, M., Narten, T., and S. Thomas, "Transmission of IPv6 Packets over Token Ring Networks," RFC 2470, Dec. 1998.

Deering, S., Fenner, W., and B. Haberman, "Multicast Listener Discovery (MLD) for IPv6," RFC 2710, Oct. 1999.

Vida, R. and L. Costa, "Multicast Listener Discovery Version 2 (MLDv2) for IPv6," RFC 3810, Jun. 2004.

Haberman, B. and J. Martin, "Multicast Router Discovery," RFC 4286, Dec. 2005.

Deering, S., "Host extensions for IP multicasting," STD 5, RFC 1112, Aug. 1989.

Deering, "Multicast Routing in Internetworks and Extended LANs," ACM Symposium on Communication Architectures and Protocols, Aug. 1998.

Haberman, B., "Allocation Guidelines for IPv6 Multicast Addresses," RFC 3307, Aug. 2002.

Cisco Tech Notes, "Multicast In a Campus Network: CGMP and IGMP Snooping," http://www.cisco.com/en/US/products/hw/switches/ps708/products_tech_note09186a00800b0871.shtml.

Briefing by Dave Thaler, Microsoft, presented to the MAGMA WG at the 56'th IETF meeting in San Francisco, http://www.ietf.org/proceedings/56/index.html.

Microsoft support article Q223136, "Some LAN Switches with IGMP Snooping Stop Forwarding Multicast Packets on RRAS Startup," http://support.microsoft.com/kb/q223136/.

Christensen, M., "Considerations for Internet Group Management Protocol (IGMP) and Multicast Listener Discovery (MLD) Snooping Switches." RFC 4541, May 2006.

Examiner's Answer in U.S. Appl. No. 90/008,558, mailed May 6, 2010—Response to the appeal brief filed Dec. 15, 2009 appealing from the Office action mailed Jun. 15, 2009.

*Enterasys Networks, Inc.*, v. *Foundry Networks, LLC et al.*, US District Court District of Massachusetts (Boston) Civil Docket For Case #: 1:05-cv-11298-DPW, Version 4.1.1 as of Mar. 20, 2010.

International Search Report (ISR) in PCT/US02/33267, mailed Dec. 2, 2002.

Office Action received in U.S. Appl. No. 12/152,617, mailed Jun. 28, 2010.

Office Action in U.S. Appl. No. 12/908,758, mailed Oct. 2, 2012.

(56) References Cited

OTHER PUBLICATIONS

Estrin, D. et al., Protocol Independent Multicast-Sparse Mode (PIM-SM): Protocol Specification, RFC 2362 [online]. Network Working Group, The Internet Society, Jun. 1988 [retrieved on Jan. 24, 2002]. Retrieved from the Internet: <URL: ftp://ftp.istedu/in-notes-rfc2362.txt>, pp. 1-62.

Fenner, W., Internet Group Management Protocol, Version 2, RFC 2236 [online]. Network Working Group, The Internet Society, Nov. 1997 [retrieved on Feb. 14, 2002]. Retrieved from the Internet: <URL: ftp://ftp.isi.edu/ in-notes-rfc2236.txt>, pp. 1-23.

McCloghrie, K., Internet Group Management Protocol MIB, RFC 2933 [online]. Network Working Group, The Internet Society, Oct. 2000 [retrieved on Feb. 14, 2002]. Retrieved from the Internet: <URL: ftp://ftp.isi.edu/in-notes¬ rfc2933.txt>, pp. 1-18.

Rodbell, M., PIM-Sparse Mode: Elements of Procedure, CSD Magazine [online]. CMP Media, LLC, Jan. 1999 [retrieved Sep. 17, 2001]. Retrieved from the Internet<URL: http://www.csdmaq.com/main/1999/9901/9901standards.htm>, 6 pages.

Rosen, E., et al., Multiprotocol Label Switching Architecture, RFC 3031 [online]. Network Working Group, TheInternet Society, Jan. 2001 [retrieved Jan. 24, 2002]. Retrieved from the Internet<URL: ftp://ftp.isi.edu/in-notes¬ rfc3031.txt>, pp. 1-57.

Simpson, W., The Point-to-Point Protocol (PPP), RFC 1661 [online], Network Working Group, The Internet Society, Jul. 1994 [retrieved Feb. 14, 2002]. Retrieved from the Internet<URL: ftp://ftp.isi.edu/in-notes-rfc1661.txt>, pp. 1-50.

Notice of Allowance in U.S. Appl. No. 12/908,758, mailed Apr. 2, 2013.

Notice of Allowance in U.S. Appl. No. 12/152,617, mailed Nov. 26, 2010.

Notice of Allowance from U.S. Appl. No. 09/982,106, dated Apr. 11, 2008.

Office Action from U.S. Appl. No. 09/982,106, dated Apr. 19, 2007.

Final Office Action from U.S. Appl. No. 09/982,106, dated Aug. 25, 2006.

Office Action from U.S. Appl. No. 09/982,106, dated Jan. 31, 2006.

Office Action from U.S. Appl. No. 09/982,106, dated Jul. 19, 2005.

Office Action from U.S. Appl. No. 09/982,106, dated Feb. 10, 2005.

BigIron Architecture Technical Brief, Foundry Networks, Inc., May 1999, pp. 1-15.

Estrin, D. et al., Protocol Independent Multicast-Sprase Mode (PIM-SM): Protocol Specification, RFC 2362 [online]. Network Working Group, The Internet Society, Jun. 1988 [revived on Jan. 24, 2002]. Retrieved from the Internet: <URL:ftp://ftp.isi.edu/in-notes-rfc2362.txt>, pp. 1-62.

Fenner, W., Internet Group Management Protocol, Version 2, RFC 2236 [online]. Network Working Group, The Internet Society, Nov. 1997 [retrieved on Feb. 14, 2002]. Retrieved from the Internet: <URL:ftp://ftp.isi.edu/in-notes-rfc2236.txt>, pp. 1-23.

McCloghrie, K., Internet Group Management Protocol MIB, RFC 2933 [online]. Network Working Group, The Internet Society, Oct. 2000 [retrieved on Feb. 14, 2002]. Retrieved from the Internet: <URL:ftp://ftp.isi.edu/in-notes-rfc2933.txt>, pp. 1-18.

Rodbell, M., PIM=Sparse Mode: Elements of Procedure, CSD Magazine [online]. CMP Media, LLC, Jan. 1999 [retrieved Sep. 17, 2001]. Retrieved from the Internet:<URL:http://www.csdmaq.com/main/1999/9901/9901standards.htm>, 6 pages.

Rosen, E., et al., Multiprotocol Label Switching Architecture, RFC 3031 [online]. Network Working Group, The Internet Society, Jan. 2001 [retrieved Jan. 24, 2002]. Retrieved from the Internet:<URL:ftp://ftp.isi.edu/in-notes-rfc3031.txt>, pp. 1-57.

Simpson, W., The Point-to-Point Protocol (PPP), RFC 1661 [online]. Network Working Group, The Internet Society, Jul. 1994 [retrieved Feb. 14, 2002]. Retrieved from the Internet:<URL:ftp://ftp.isi.edu/in-notes-rfc1661.txt>, pp. 1-50.

Experimental Internet Protocol Standard Request for Comments, RFC 2362 (Internet Architecture Board) as Protocol Independent Multicast (PIM) Sparse Mode (SM), 1998.

Final Office Action from U.S. Appl. No. 12/152,617, dated Feb. 22, 2010.

Office Action from U.S. Appl. No. 12/152,617, dated Jun. 12, 2009.

\* cited by examiner

METHOD AND SYSTEM FOR INTELLIGENTLY FORWARDING MULTICAST PACKETS

CROSS REFERENCE TO RELATED APPLICATIONS

This application is a divisional of U.S. patent application Ser. No. 12/152,617, filed May 14, 2010, entitled "Method and System for Intelligently Forwarding Multicast Packets," now U.S. Pat. No. 7,877,508, issued Jan. 25, 2011, which is a continuation of U.S. patent application Ser. No. 09/982,106, filed Oct. 19, 2001, entitled "Method and System for Intelligently Forwarding Multicast Packets," now U.S. Pat. No. 7,389,359, issued Jun. 17, 2008, commonly owned herewith.

BACKGROUND OF THE INVENTION

1. Field of the Invention

The present invention relates generally to communication internetworking, and more specifically, to forwarding signals within a communications network.

2. Related Art

With the advent of the World Wide Web (WWW), global computer networks have quickly become cost-effective and reliable mediums for the exchange and management of information within an extensive array of computers and smaller computer networks. The computer networks vary in size and type such as, local internets, corporate intranets, local area networks (LAN), wide area networks (WAN), private enterprise networks, and the like. The global Internet is the most commonly known global computer network.

The evolution of global computer networks and supporting technologies has made it possible for government officials, educational institutions, businesses, nonprofit organizations, and individuals to communicate with the local networks or personal computers of other persons or organizations. The recreational and entertainment industries are also using global computer networks to expand their potential customer bases. As a result, more individuals and companies are using the Internet, for example, to transmit and/or multicast content for a variety of personal and business reasons. For example, a recording company may broadcast a live concert over the Internet to subscribers. As another example, a television production company may multicast a televised show over the Internet to a group of subscribers.

As more individuals and/or organizations take advantage of global computer networks to multicast content to a group of subscribers, greater emphasis must be placed on designing a distribution network capable of handling periods of heavy traffic. In a conventional multicast Internet exchange, a network of routers is provided to transport the multicast content from a host-server to the client members of a group. Typically, the multicast packets are transmitted to every available router within a virtual local area network (VLAN). Upon receipt of the multicast packets, the routers must determine the destination and forward the packets downstream to the next router or client end station.

Flooding multicast traffic to every port within a VLAN is not the most efficient or cost-effective way to forward multicasts. As such, some multicast protocols have been developed to limit the multicast traffic to a few select ports within a VLAN. The ports are selected by determining whether the port communicates directly or indirectly with a client group member. An example of such a limited multicast protocol is described in Experimental Internet Protocol Standard, Request for Comments (RFC) 2362 (Internet Architecture Board) as Protocol Independent Multicast (PM) Sparse Mode (SM).

However, even with a limited multicast protocol, there exists no conventional method for quickly, efficiently, and inexpensively forwarding a multicast packet by a layer 2 switch. The term "layer" is used herein to refer to, for example, a layer of the Open Systems Interconnection (OSI) seven-layer Reference Model. As apparent to one skilled in the relevant art(s), a layer 2 switch operates at the data link layer or layer 2 as defined by the OSI Reference Model. At layer 3 or network layer, as defined by the OSI Reference Model, forwarding activity is performed by a router.

Commercially available switches, such as those available from Cisco Systems, Inc., create a special label or tag for multicast packets. Although tag switching enables a router to read the tag and forward the packet, the router must be specially configured to be able to interpret the tag. A hub, a commonly used layer 2 device, broadcasts traffic to all interfaces. This is expensive in terms of bandwidth usage, and inefficient as traffic is sent unnecessarily to interfaces or networks that may not require the traffic, thereby wasting network and CPU resources.

Other conventional network devices, such as routers, use the network layer to route and forward multicasts. Layer 3 processing requires additional processing time and memory. As such, like tag switching, the routing device must be specially configured to implement these processing requirements.

Therefore, a method and system are needed to address the above problems, and provide layer 2 processing to forward multicast packets efficiently and quickly.

SUMMARY OF THE INVENTION

The present invention solves the above problems by providing a method and system for intelligently forwarding multicast packets by a layer 2 switch. A switch is provided to implement layer 2 switching among a plurality of input/output ports that are connected to neighboring devices. The neighboring devices include other routers, end stations, and/or like network devices.

A packet processor is connected to the input/output ports and receives all content packets. The packet processor extracts a lookup key that is based on the destination address of the content packet. The switch of the present invention supports content packets from shared and explicit sources. As such, for shared source distributions, the packet processor derives a destination media access control (MAC) address as the lookup key. For explicit source distributions, the packet processor derives a lookup key that is based on a source address, a destination address, a protocol type, and an incoming port, all associated with the content packet.

The lookup key is used to query a forwarding memory that contains a source-group table. The source-group table includes a listing of all multicast groups that are being serviced by the switch. For shared source distributions, the forwarding memory also includes a forwarding table. Each entry in the forwarding table records a destination MAC address for a group and a corresponding outgoing port index. Similarly, for explicit source distributions, the forwarding memory also includes a session table. Each entry in the session table records, for each group, a source address, a destination address, a protocol type, an incoming port, and a corresponding outgoing port index.

Accordingly, packet processor queries forwarding memory which returns an outgoing port index. The outgoing port index serves as a lookup key to an outgoing port lookup table. The result of a lookup in the outgoing port lookup table is a list of outgoing port(s) that currently services the neighboring device(s) designated for the content packet.

The switch also receives and processes control messages that are used to configure (including, create, maintain and update) the forwarding memory and outgoing port lookup table. For instance, neighboring routers periodically exchange join/prune messages. Upon receipt, the switch of the present invention processes the join/prune messages to update the group lists stored or referenced in the forwarding memory and outgoing port lookup table. Neighboring routers also periodically exchange "hello" messages to announce their presence to each other. The switch processes the hello messages to build a neighbor list. The neighbor list specifies a source address and the incoming port that is connected to the source router of the hello message. This information is used to determine an outgoing port for a subsequent packet destined for that particular router.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention. In the drawings, like reference numbers indicate identical or functionally similar elements. Additionally, the leftmost digit (s) of a reference number identifies the drawing in which the reference number first appears.

DETAILED DESCRIPTION OF THE INVENTION

I. Introduction

The method and system of the present invention provides protocol snooping to intelligently forward multicast packets to those ports of a switch that are connected to a neighboring device that directly or indirectly services the members of a multicast group. In an embodiment, the protocol type is Protocol Independent Multicast (PIM). However the present invention supports other multicast protocols and/or standards.

Protocol snooping limits the multicast content to only those routers, within a VLAN domain, that require the content. Therefore, multicast traffic is not required to be seen by all multicast routers in the VLAN. As a result, the present invention can be implemented to conserve bandwidth on the VLAN because not all receivers are required to see the multicast traffic. The switch of the present invention also is not required to be configured for any special tagging technique because intelligent forwarding is based on information learned from control messages exchanged between the multicast routers.

II. System Overview

Figure 1:
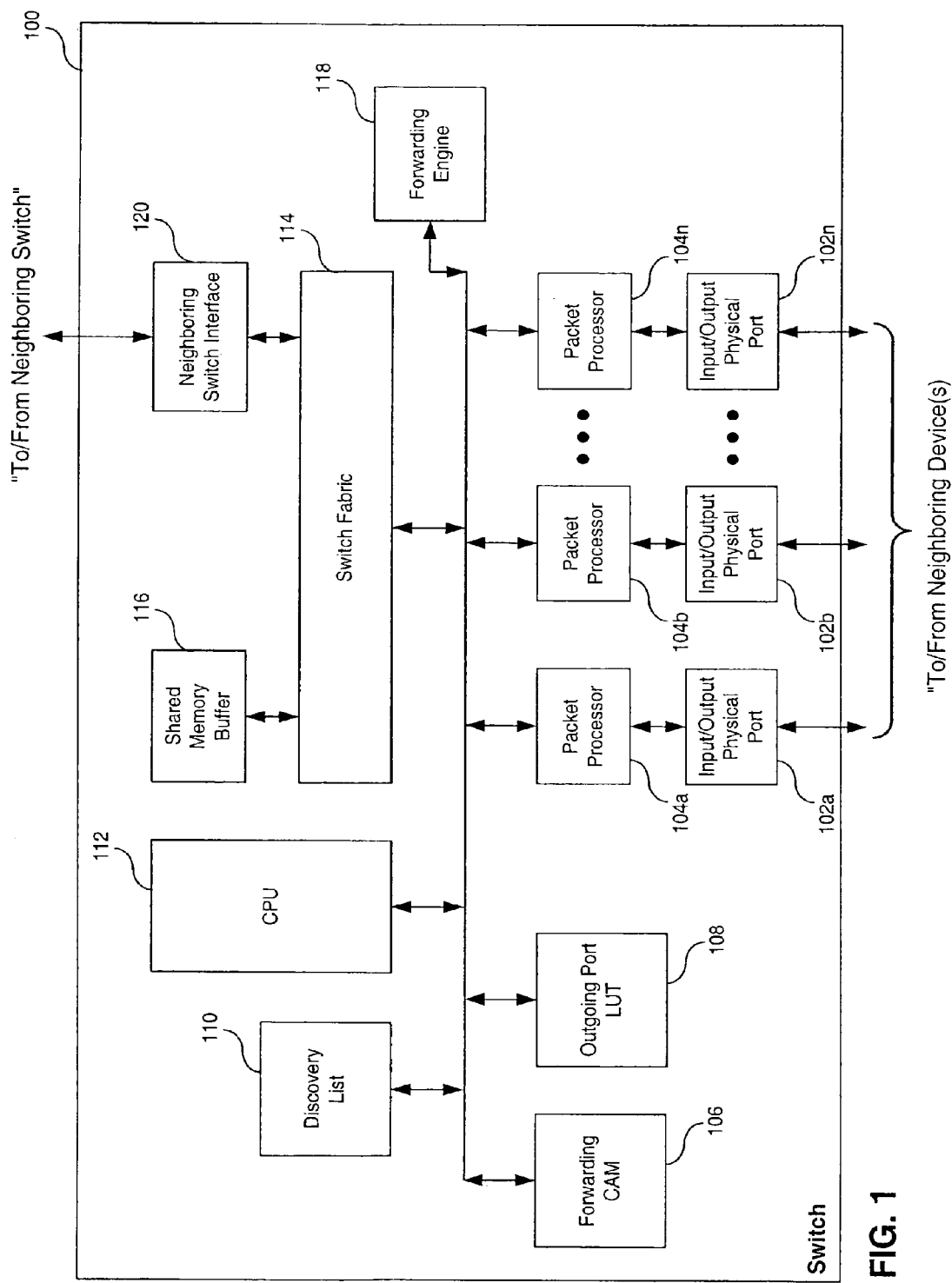
FIG. 1 illustrates a layer 2 switch according to an embodiment of the present invention.

FIG. 1 illustrates a switch 100 according to an embodiment of the present invention. Switch 100 includes a plurality of input/output (I/O) physical ports 102a-102n, a plurality of packet processors 104a-104n, a forwarding content addressable memory (CAM) 106, an outgoing port lookup table (LUT) 108, a discovery list 110, a central processor (CPU) 112, a switch fabric 114, a shared memory buffer 116, a forwarding engine 118, and one or more neighboring switch interfaces (UF) 120. The I/O physical ports 102a-102n (collectively referred to herein as I/O ports 102) serve as a physical layer interface supporting bi-directional communication between switch 100 and another neighboring device, such as an end station, a router, and/or like network device. Each individual I/O port 102 is connected to one or more neighboring devices. The connection between each I/O port 102 and the neighboring device(s) comprises wired, wireless, or both transmission media, including satellite, terrestrial (e.g., fiber optic, copper, coaxial, hybrid fiber-coaxial (HFC), or the like), radio, microwave, and/or any other form or method of transmission.

The I/O ports 102 are connected to packet processors 104a-104n (collectively referred to herein as packet processors 104). Each I/O port 102 exchanges packetized signals (e.g., electronic, electromagnetic, optical, or the like), demodulates the packetized signals, and delivers the packets to a packet processor 104. Each packet processor 104 parses and examines the packets for further processing. Further processing depends on whether the packets contain a control message and/or content payload(s).

If a packet contains content payload(s) (e.g., voice, data, and/or other forms of media, multimedia, or the like), packet processor 104 examines the packet to determine forwarding information (FID) regarding the disposition of the packet. The FID includes a destination port, port mirror requirement, packet type, VLAN handling, prioritization, multicast group membership, and/or like features. The destination port indicates which of the plurality of I/O ports 102 will receive the packet. As described in greater detail below, packet processor 104 interacts with forwarding CAM 106, outgoing port LUT 108, and/or CPU 112 to determine the FID. Packet processor 104 postpends the FID to the packet before the packet is forwarded to switch fabric 114.

Forwarding engine 118 communicates with each packet processor 104, switch fabric 114, CPU 112, and other components of switch 100, as required. Forwarding engine 118 uses the FID, or the like, to direct traffic from one location to the next.

Switch fabric 114 is connected to shared memory buffer 116 and neighboring switch interface(s) 120. Switch fabric 114 stores packets in shared memory buffer 116. Shared memory buffer 116 assigns a shared memory location identifier (SMID) to each received packet, and stores the SMID in a priority queue located in the shared memory buffer 116. The priority queue is associated with the I/O port(s) 102 and/or neighboring switch interface(s) 120 designated in the FID. When the SMID reaches the front of the queue, the priority queue is emptied on a FIFO basis and the associated packet is forwarded to the associated I/O port(s) 102 and/or neighboring switch interface(s) 120. I/O port(s) 102 and/or neighboring switch interface(s) 120 operate to modulate packets and send packetized signals to a designated device(s).

In regards to I/O port(s) 102, the designated device(s) can be a neighboring end station, a router, and/or like network device, as described above. In regards to neighboring switch interface(s) 120, the designated device(s) is one or more neighboring switches, such as another switch 100, or like switching device(s). As described with respect to I/O ports 102, the connection between neighboring switch interface(s) 120 and a neighboring switch(es) comprises wired, wireless, or both transmission media, including satellite, terrestrial (e.g., fiber optic, copper, coaxial, hybrid fiber-coaxial (HFC), or the like), radio, microwave, and/or any other form or method of transmission.

On the other hand, if a packet received at packet processor 104 is a control message or if a content packet contains a control message (for example, in a header frame), packet processor 104 forwards the control message to discovery list 110 or CPU 112, as described in greater detail below. The present invention supports two types of control messages for determining FID: a hello message and a join/prune message. Both control message types are defined in Experimental Internet Protocol Standard, Request for Comments (RFC) 2362 (Internet Architecture Board). However the present invention includes any similar control messages created and/or exchanged to provide the functions described herein.

Accordingly, a neighboring router periodically transmits a hello message to switch 100 to announce its presence to switch 100 and/or other upstream designated router(s). Packet processor 104 forwards the hello message to discovery list 110. Discovery list 110 stores the hello message until it is retrieved by CPU 112, as described in greater detail below.

The second type of control message is a join/prune message. A neighboring router periodically exchanges join/prune messages with switch 100 and/or other neighboring router(s) to designate group memberships for a multicast. A join/prune message contains both a join set and a prune set. The join set lists the groups that receivers have requested, and the prune set lists the groups that are not required by receivers. Packet processor 104 forwards the join/prune message to CPU 112 for further processing, as described in greater detail below.

FIG. 1 is a conceptual illustration of switch 100 that facilitates explanation of the present invention. It would be apparent to one skilled in the relevant art(s) that one or more of the blocks can be performed by the same piece of hardware, module of software, or a combination thereof. It should also be understood that embodiments of the present invention can be implemented in hardware, software, or a combination thereof. In such an embodiment, the various components and steps would be implemented in hardware and/or software to perform the functions of the present invention. It should be understood that either of discovery list 110, forwarding CAM 106, and outgoing port LUT 108 can be any type of memory, including RAM, SDRAM, or the like.

III. Constructing and Updating Forwarding Information

As described in reference to FIG. 1, packet processor 104 examines each content packet to determine its FID. The FID is postpended to the content packet, and switch 100 subsequently uses the FID to handle the disposition of the content packet. To determine the FID, packet processor 104 interacts with other system components to query one or more FID tables stored in the system memories (i.e., forwarding CAM 106, outgoing LUT 108, and/or discovery list 110). The FID tables are periodically populated and refreshed by control messages exchanged by the neighboring routers.

Figure 2:
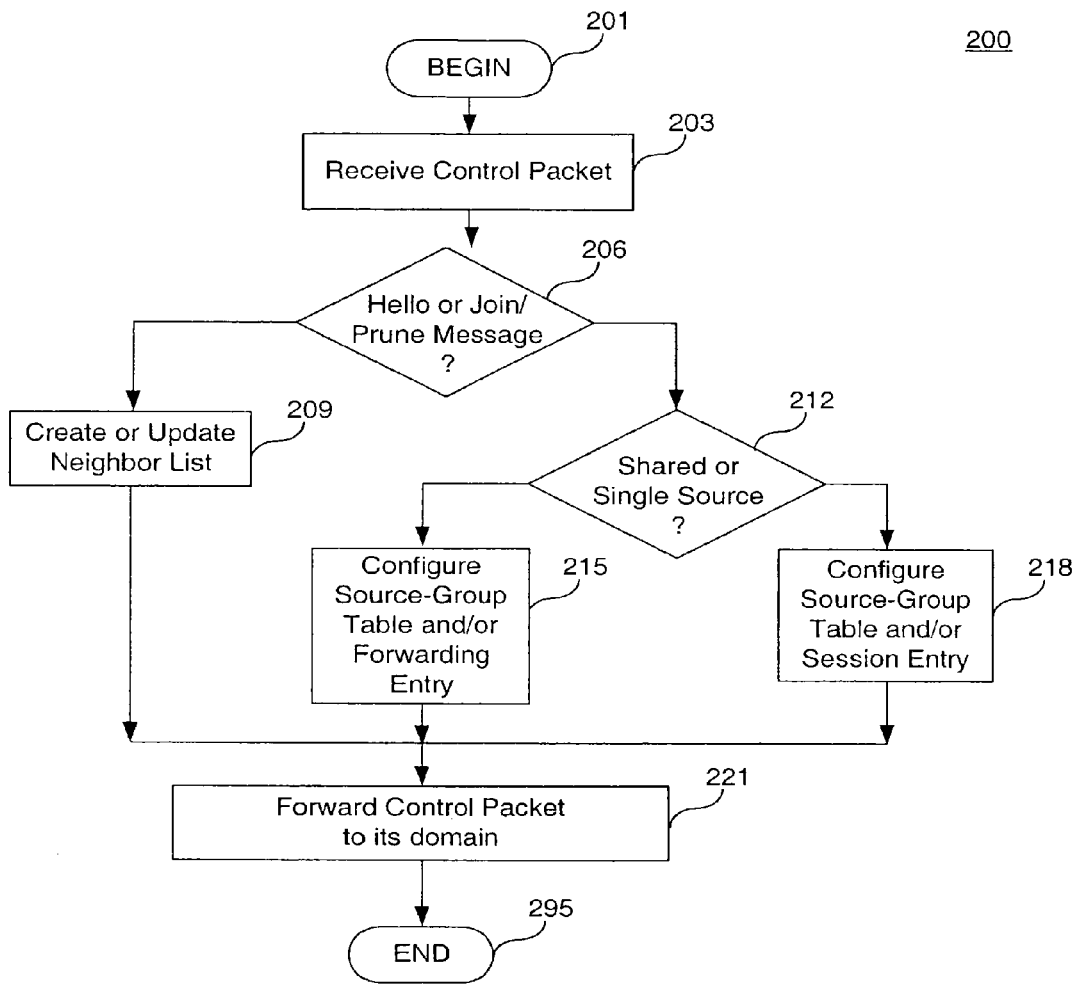
FIG. 2 illustrates an operational flow diagram for processing control packets according to an embodiment of the present invention.

Referring to FIG. 2, flowchart 200 represents the general operational flow of an embodiment of the present invention. More specifically, flowchart 200 shows an example of a control flow for processing control messages to create or update forwarding information for multicasts.

The control flow of flowchart 200 begins at step 201 and passes immediately to step 203. At step 203, an I/O port 102 receives a packetized signal having a control message from a neighboring device. The physical form of the signal can be electronic, electromagnetic, optical, or the like. The signal is demodulated and delivered to packet processor 104.

At step 206, packet processor 104 determines the type of control message. As described above, in an embodiment, the control message is either a hello message or a join/prune message. If a hello message is detected, forwarding engine 118 sends the hello message to CPU 112, or stores the control packet in discovery list 110. Afterwards, the control passes to step 209.

At step 209, CPU 112 processes the hello message to create or update a neighbor list. The neighbor list identifies the neighboring router that sent the hello message, the address (e.g., IP address) of the neighboring router, the incoming I/O port 102 that received the hello message, and the like. As such, switch 100 is able to track and update a list of FIP addresses and I/O port(s) 102 that are associated with a neighboring router that transmits a hello message.

If the hello message is received from neighboring switch interface(s) 120, CPU 112 makes note that the corresponding router(s) is being serviced by a neighboring switch. Therefore, the incoming neighboring switch interface(s) 120 is noted in the neighbor list instead of noting an incoming I/O port 102.

On the contrary, if at step 206, a join/prune message is detected, the control passes to step 212. At step 212, the multicast mode of operation is considered. In an embodiment, switch 100 supports two operational modes for multicasting: shared source distribution multicasting and single source distribution multicasting. In an embodiment, shared source distribution multicasting is defined by protocol independent multicasting (PIM) sparse mode (SM) operational mode, and explicit source distribution multicasting is defined by PIM single source multicasting (SSM) operational mode. In an embodiment, the operational mode is established manually by a systems operator. In another embodiment, the operational mode is set and/or altered by CPU 112 and/or another application software in communication with CPU 112.

It should be understood, however, that the present invention supports other multicast protocols in addition to PIM SM and PIM SSM, as would be apparent to one skilled in the relevant art(s). For example, the switch of the present invention can be configured to support the Multiprotocol Label Switching (MPLS) standards defined by the Internet Engineering Task Force, the Point-to-Point Protocol (PPP) defined in Internet Protocol Standard (STD) 51, Request for Comments (RFC) 1661 (Internet Architecture Board), and/or like standards and/or protocols governing layer 2 switching.

Therefore, referring back to FIG. 2, the control passes to step 215 if the control message establishes shared source distribution trees (e.g., PIM SM operational mode), and the control passes to step 218 if the control message establishes explicit source distribution trees (e.g., PIM SSM operational mode).

At step 215, forwarding engine 118 transfers the join/prune message from packet processor 104 to CPU 112. In turn, CPU 112 processes the join/prune message to construct or update one or more FID tables within forwarding CAM 106. Generally, the FID tables include a source-group table and a forwarding table and/or a session table. With respect to step 215, the FID tables include a source-group table and a forwarding table. The source-group table includes various data about the members of a multicast group. Such data includes, but is not limited to, a source address, destination address, and an outgoing port index associated with the source and/or destination address. The source address can be undefined or a wildcard since a multicast packet may have multiple sources. Accordingly, CPU 112 processes the join/prune message to update the aforementioned entries in the source-group table. CPU 112 also notes the incoming I/O port 102 that received the join/prune message and add an outgoing port index to the source-group table that identifies the incoming I/O port 102.

Thereafter, CPU 112 also creates an entry in outgoing port LUT 108 to associate the outgoing port index to the receiving incoming I/O port 102.

Another FID table residing in forwarding CAM 106 is a forwarding table. Forwarding table comprises one or more forwarding entries that include a destination MAC address and an outgoing port index. Accordingly, CPU 112 updates the forwarding entries if the join/prune message is related to an existing destination MAC address.

Specifically, CPU 112 extracts multicast group information from the join/prune message to derive the destination MAC address. As described, the join list identifies the network addresses for neighboring routers that have been added to a distribution tree to support multicasts from the request group. The prune list, conversely, identifies the network addresses for the neighboring routers that will be removed from a distribution tree. Thus, the prune list specifies a holdover period stipulating a time for discontinuing the membership of a neighboring router from a distribution tree.

Thus the multicast group information, extracted by CPU 112, includes network address (e.g., destination IP addresses) for designated neighboring routers. CPU 112 derives a destination MAC address from this multicast group information. In an embodiment, the MAC address is derived by reading the first three octets (bytes) of the multicast group address (e.g., IP address). As known to one skilled in the relevant art(s), the first three bytes of any multicast address are 01:00:5e. These three bytes are used as the first three octets in the MAC address. Next, the remaining three octets are constructed from the multicast group address which has 32 bits. Only the lower 23 bits of the multicast group address are used to construct the multicast MAC address.

Once constructed, the destination MAC address serves as a shared source lookup key. Accordingly, when packet processor 104 receives a multicast content packet, the destination MAC address is used as the lookup key to determine an outgoing port index for the received packet. The outgoing port index serves as a lookup key into outgoing port LUT 108. As such, outgoing port LUT 108 specifies one or more "outgoing" I/O ports 102 (and/or neighboring switch interface(s) 120) for each outgoing port index. When queried, outgoing port LUT 108 returns the outgoing I/O port(s) 102 (and/or neighboring switch interface(s) 120) to packet processor 104 to identify the destination neighboring device(s). Packet processor 104 postpends this forwarding information to the packet and forwards the packet to switch fabric 114, as described in greater detail below.

Therefore, after deriving the destination MAC address for the group, CPU 112 searches for a forwarding entry having a matching destination MAC address, and updates the forwarding table in forwarding CAM 106. This is accomplished by CPU 112 retrieving the associated outgoing port index. Thereafter, CPU 112 utilizes the outgoing port index to query the associated tuple in outgoing port LUT 108. CPU 112 then updates the tuple by revising the associated outgoing ports (i.e., I/O port(s) 102 and/or neighboring switch interface(s) 120) according to the designated routers and/or other device(s) in the new group.

As the multicast group information comprises network addresses, CPU 112 performs layer 3 processing to derive the MAC address. CPU 112 thus populates forwarding CAM 106 with the layer 3 information. Therefore, when packet processor 104 queries forwarding CAM 106, packet processor 104, in essence, utilizes information derived from layer 3 processing (i.e., protocol type and network address) to intelligently forward a packet during layer 2 processing.

As described, the present invention supports both shared trees and explicit source trees. For shared trees, forwarding is based on the MAC destination address lookup described in reference to step 215. However, for a source specific tree, a session lookup methodology is implemented as described with respect to step 218.

At step 218, the join/prune message has specified an explicit source distribution tree (e.g., PIM SSM operational mode). Hence, forwarding engine 118 transfers the join/prune message from packet processor 104 to CPU 112. In turn, CPU 112 processes the join/prune message to construct or update the FID table(s). With respect to step 218, the FID tables include a source-group table and a session table. The source-group table includes various data about the members of a multicast group, as described above in reference to step 215. The session table includes a session entry comprising a multicast source IP address, a destination IP address, an incoming port (i.e., I/O port 102 or neighboring switch interface 120), and protocol type as part of the explicit source lookup key, and outgoing port index being the result of lookup. The incoming port is used to specify which I/O port(s) 102 (and/or neighboring switch interface(s) 120) are eligible for a session match once a packet arrives on an I/O port 102.

Therefore, when processing a join/prune message, CPU 112 derives the explicit source lookup key information from the control message, and searches for a matching session entry. If an matching entry is determined, CPU 112 retrieves the associated outgoing port index. Thereafter, CPU 112 utilizes the outgoing port index to query the associated tuple in outgoing port LUT 108. CPU 112 then updates the tuple by revising the associated outgoing ports (i.e., I/O port(s) 102 and/or neighboring switch interface(s) 120) according to the designated routers and/or other device(s) in the new group.

As described in detail below, a session entry is queried, or created if necessary, when a multicast content packet is received by packet processor 104 and forwarded to CPU 112. The outgoing port index, resulting from a lookup in the session table, serves as a lookup key into outgoing port LUT 108. The list of outgoing ports (i.e., I/O port(s) 102 and/or neighboring switch interface(s) 120) are constructed and maintained according to join/prune messages as described above.

Once discovery list 110, forwarding CAM 106, and/or outgoing port LUT 108 have been properly constructed or updated, the control passes to step 221. At step 221, CPU 112, interacting with forwarding engine 118, either returns the hello message or join/prune message to packet processor 104, or forwards the control message to switch fabric 114. If the control message is destined for another router within the VLAN domain, the control message is associated with a SMID, queued according to the designated neighboring router, and forwarded to the router so that the neighboring router can update its forwarding table or neighbor list. After the packet has been transmitted to the designated neighboring router(s), the control flow ends as indicated by step 295.

IV. Intelligent Forwarding Shared and Explicit Source Multicasts

Figure 3:
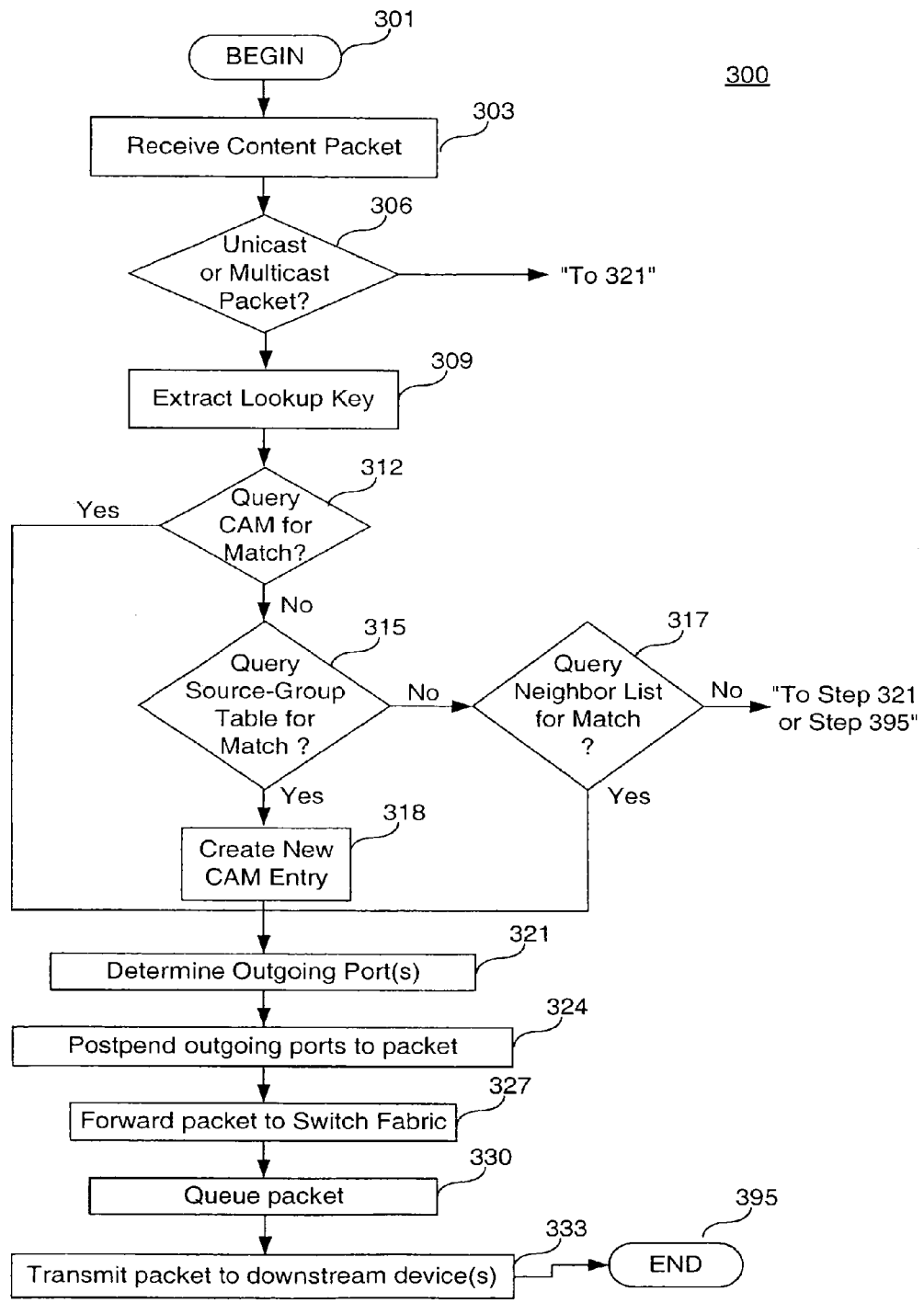
FIG. 3 illustrates an operational flow diagram for intelligently forwarding a multicast packet according to an embodiment of the present invention.

Referring to FIG. 3, flowchart 300 represents the general operational flow of an embodiment of the present invention. More specifically, flowchart 300 shows an example of a control flow for intelligently forwarding multicast content packets in shared source distribution multicast operational mode or explicit source distribution multicast operational mode.

The control flow of flowchart 300 begins at step 301 and passes immediately to step 303. At step 303, an I/O port 102 receives a packetized content signal from a neighboring device. The physical form of the signal can be electronic, electromagnetic, optical, or the like. The signal is demodulated and delivered to packet processor 104.

At step 306, packet processor 104 determines whether the signal comprises a unicast content packet or a multicast content packet. In an embodiment, packet processor 104 examines the destination address to determine if the packet is a unicast packet or a multicast packet. For instance, a multicast content packet has a Class D IP destination address ranging from "224.1.0.0" to "239.255.255.255." If packet processor 104 detects a unicast packet, the control flow passes immediately to step 321, as described below. Otherwise, the control flow passes to step 309 for multicast processing.

At step 309, packet processor 104 derives or reads a lookup key. As described in reference to FIG. 2, switch 100 supports two modes of operation: shared source distribution multicasting and explicit source distribution multicasting.

Referring back to step 309, if switch 100 is operating with shared source distributions (e.g., PIM SM), packet processor 104 extracts a shared source lookup key. Packet processor 104 reads or derives a destination MAC address from the content packet, and the destination MAC address is used as the shared source lookup key. In an embodiment, the destination MAC address is derived by reading the first three octets and constructing the remaining three octets from the multicast group address, as described above in reference to step 215 in FIG. 2.

On the other hand, if, at step 309, switch 100 is operating with explicit source distributions (e.g., PIM SSM), packet processor 104 extracts an explicit source lookup key from the content packet. The explicit source lookup key is based on the source IP address, destination IP address, protocol type derived from the multicast packet, and the incoming I/O port 102 that received the packet.

At step 312, packet processor 104 utilizes the lookup key to query a FID table stored in forwarding CAM 106. More specifically, for shared source distributions, packet processor 104 utilizes the destination MAC address as the lookup key to query a forwarding table located in forwarding CAM 106. For explicit source distributions, packet processor 104 utilizes the explicit source lookup key to query a session table located in forwarding CAM 106. If a match is found, the control flow passes immediately to step 321, as described below. Otherwise, the control flow passes to step 315.

At step 315, the content packet is delivered to CPU 112 for further processing since no match exists for the extracted lookup key. Using other information extracted from the content packet, CPU 112 queries the source-group table residing in forwarding CAM 106. In an embodiment, CPU 112 uses the destination group address and, if available, the destination source address(es) to locate a matching entry. If a match is determined, CPU reads the corresponding outgoing port index, and control passes to step 318.

At step 318, CPU 112 creates a new entry in either the forwarding table or session table. For shared source distributions, a new forwarding entry is added to the forwarding table based on the derived destination MAC address. For explicit source distributions, a new session entry is added to the session table based on the session lookup key. From the information returned from the source-group table, CPU 112 adds the returned outgoing port index to the forwarding entry or session entry.

However, if a match is not determined at step 315, control passes to step 317. At step 317, CPU 112 identifies the outgoing I/O port(s) 102 (and/or neighboring switch interface(s) 120) that currently services the destination router(s) or other network device(s) associated with the destination address from the content packet. To identify the outgoing I/O port(s) 102 (and/or neighboring switch interface(s) 120), CPU 112 queries discovery list 110 to determine if a hello message has been received from the destination router(s). If a hello message has been received, CPU 112 reads the outgoing I/O port(s) 102 (and/or neighboring switch interface(s) 120) from the neighbor list. Thereafter, control passes to step 321.

If no hello message has been received from the destination router(s), the packet is dropped for that router(s), and the control flow passes immediately to step 395. However, in an alternative embodiment, the packet is multicast to all routers within the VLAN if no hello message has been received from the destination router(s). As such, CPU 112 would identify all outgoing I/O port(s) 102 (and/or neighboring switch interface (s) 120) that service each router within the VLAN. In this embodiment, the control flow would then pass to step 321.

At step 321, packet processor 104 receives the outgoing I/O port(s) 102 and/or neighboring switch interface(s) 120 for the content packet. More specifically, if a lookup match is found at step 312, forwarding CAM 106 returns the outgoing port index corresponding to the lookup key (i.e., destination MAC address or explicit source lookup key). Subsequently, outgoing port LUT 108 is queried to identify the outgoing I/O port(s) 102 and/or neighboring switch interface(s) 120 corresponding to the outgoing port index. The corresponding list of outgoing I/O port(s) 102 and/or neighboring switch interface (s) 120 is sent to packet processor 104.

However, if a new table entry is created at step 318, the corresponding outgoing I/O port(s) 102 and/or neighboring switch interface(s) 120 are retrieved from outgoing port LUT 108 based on the outgoing port index returned from the source-group table. Additionally, if the corresponding outgoing I/O port(s) 102 and/or neighboring switch interface(s) 120 are determined from the neighbor list as described at step 317, the corresponding list is simply forwarded to packet processor 104.

If a unicast packet is detected at step 306, then, at step 321, forwarding CAM 106 returns the FID for the packet. The FID includes the outgoing I/O port(s) 102 or neighboring switch interface(s) 120 for the destination neighboring device. The FID is sent to packet processor 104, and the control flow passes to step 324.

At step 324, packet processor 104 receives the list of outgoing I/O port(s) 102 and/or neighboring switch interface(s) 120 corresponding to the content packet. Packet processor 104 postpends the list to the packet.

At step 327, forwarding engine 118 interacts with packet processor 104 to forward the packet to switch fabric 114. At step 330, switch fabric 114 creates a SMID for the packet, and stores the packet in shared memory buffer 116. Switch fabric 114 also stores the corresponding SMID in a priority queue also located in shared memory buffer 116. At step 333, switch fabric 114 sends the packet to the outgoing I/O port(s) 102 and/or neighboring switch interface(s) 120 linked to the designated neighboring device(s). The outgoing I/O port(s) 102 and/or neighboring switch interface(s) 120 modulate the packetized signal and transmit the signal to the designated neighboring device(s). After the packet has been transmitted to the designated neighboring device(s), the control flow ends as indicated by step 395.

V. Conclusion

FIGS. 1-3 are conceptual illustrations that facilitates explanation of the present invention. It will be apparent to one skilled in the relevant art(s) that the same piece of hardware or module of software can perform one or more of the blocks. It should also be understood that embodiments of the present invention could be implemented in hardware, software, or a combination thereof. In such an embodiment, the various components and steps would be implemented in hardware and/or software to perform the functions of the present invention.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover, it should be understood that the method and system of the present invention should not be limited to a network with one layer 2 switch. The present invention can be implemented in any network of routers interconnected via several layer 2 switches in the core. Thus, the present invention should not be limited by any of the above-described exemplary embodiments, but should be defined only in accordance with the following claims and their equivalents.

What is claimed is:

1. A method comprising:
    receiving, by a Layer 2 switch, a router-to-router Layer 3 multicast control message, the router-to-router Layer 3 multicast control message being either:
        a Protocol Independent Multicast (PIM) hello message transmitted by a router to announce the router's presence to other neighboring routers; or
        a PIM join or PIM prune message transmitted by a router to identify multicast group memberships to other neighboring routers; and
    processing, by a processor of the Layer 2 switch, the router-to-router Layer 3 multicast control message to create forwarding information for use by the Layer 2 switch in forwarding multicast content packets.

2. The method of claim 1 wherein the forwarding information comprises:
    a discovery list storing instances of the PIM hello message received by the Layer 2 switch;
    a forwarding table storing outgoing port indexes corresponding to physical addresses derived from multicast group addresses; and
    an outgoing port lookup table storing outgoing ports for outgoing port indexes.

3. The method of claim 2 wherein the forwarding information further comprises:
    a source-group table storing a listing of multicast groups serviced by the Layer 2 switch; and
    a session table storing a plurality of session entries, each session entry identifying a multicast group, a source address, a destination address, a protocol type, an incoming port, and a corresponding outgoing port index.

4. The method of claim 1 wherein processing the router-to-router Layer 3 multicast control message to create forwarding information for use by the Layer 2 switch in forwarding multicast content packets comprises:
    determining whether the router-to-router Layer 3 multicast control message is the PIM hello message or the PIM join or PIM prune message; and
    if the router-to-router Layer 3 multicast control message is the PIM hello message, creating a neighbor list that identifies:
        an IP address of a router that sent the PIM hello message; and
        an incoming port of the Layer 2 switch on which the PIM hello message was received.

5. The method of claim 4 wherein processing the router-to-router Layer 3 multicast control message to create forwarding information for use by the Layer 2 switch in forwarding multicast content packets further comprises:
    if the router-to-router Layer 3 multicast control message is the PIM join or PIM prune message:
        determining a multicast mode of operation specified by the PIM join or PIM prune message;
        creating a first set of forwarding information tables in a forwarding content addressable memory (CAM) of the Layer 2 switch if the multicast mode of operation corresponds to an explicit source distribution tree; and
        creating a second set of forwarding information tables in the forwarding CAM if the multicast mode of operation corresponds to a shared source distribution tree.

6. The method of claim 1 wherein the processing of the router-to-router Layer 3 multicast control message and the creating the forwarding information is performed by the processor of the Layer 2 switch prior to transmitting the router-to-router Layer 3 multicast control message to its designated destination router.

7. A Layer 2 switch comprising:
    a memory;
    a plurality of ports;
    one or more processors; and
    a non-transitory computer-readable storage medium having stored thereon software that, when executed by the one or more processors, causes the one or more processors to:
        receive a router-to-router Layer 3 multicast control message, the router-to-router Layer 3 multicast control message being either:
            a Protocol Independent Multicast (PIM) hello message transmitted by a router to announce the router's presence to other neighboring routers; or
            a PIM join or PIM prune message transmitted by a router to identify multicast group memberships to other neighboring routers; and
        process the router-to-router Layer 3 multicast control message to create forwarding information for use by the Layer 2 switch in forwarding multicast content packets.

8. The Layer 2 switch of claim 7 wherein the forwarding information comprises:
    a discovery list storing instances of the PIM hello message received by the Layer 2 switch;
    a forwarding table storing outgoing port indexes corresponding to physical addresses derived from multicast group addresses; and
    an outgoing port lookup table storing outgoing ports for outgoing port indexes.

9. The Layer 2 switch of claim 8 wherein the forwarding information further comprises:
    a source-group table storing a listing of multicast groups serviced by the Layer 2 switch; and
    a session table storing a plurality of session entries, each session entry identifying a multicast group, a source address, a destination address, a protocol type, an incoming port, and a corresponding outgoing port index.

10. The Layer 2 switch of claim 7 wherein the software that causes the one or more processors to process the router-to-router Layer 3 multicast control message to create forwarding information for use by the Layer 2 switch in forwarding multicast content packets comprises software that causes the one or more processors to:
    determine whether the router-to-router Layer 3 multicast control message is the PIM hello message or the PIM join or PIM prune message; and if the router-to-router Layer 3 multicast control message is the PIM hello message, create a neighbor list that identifies:
an IP address of a router that sent the PIM hello message; and
an incoming port of the Layer 2 switch on which the PIM hello message was received.

11. The Layer 2 switch of claim 10 wherein the software that causes the one or more processors to process the router-to-router Layer 3 multicast control message to create forwarding information for use by the Layer 2 switch in forwarding multicast content packets further comprises software that causes the one or more processors to:
if the router-to-router Layer 3 multicast control message is the PIM join or PIM prune message:
determine a multicast mode of operation specified by the PIM join or PIM prune message;
create a first set of forwarding information tables in a forwarding content addressable memory (CAM) of the Layer 2 switch if the multicast mode of operation corresponds to an explicit source distribution tree; and
create a second set of forwarding information tables in the forwarding CAM if the multicast mode of operation corresponds to a shared source distribution tree.

12. The Layer 2 switch of claim 7 wherein the one or more processors process the router-to-router Layer 3 multicast control message and create the forwarding information prior to transmitting the router-to-router Layer 3 multicast control message to its designated destination router.

13. A non-transitory computer readable storage medium having stored thereon a program of instructions that, when executed by a processor of a Layer 2 switch, causes the processor of the Layer 2 switch to:
receive a router-to-router Layer 3 multicast control message, the router-to-router Layer 3 multicast control message being either:
a Protocol Independent Multicast (PIM) hello message transmitted by a router to announce the router's presence to other neighboring routers; or
a PIM join or PIM prune message transmitted by a router to identify multicast group memberships to other neighboring routers; and
process the router-to-router Layer 3 multicast control message to create forwarding information for use by the Layer 2 switch in forwarding multicast content packets.

14. The non-transitory computer readable storage medium of claim 13 wherein the forwarding information comprises:
a discovery list storing instances of the PIM hello message received by the processor;
a forwarding table storing outgoing port indexes corresponding to physical addresses derived from multicast group addresses; and
an outgoing port lookup table storing outgoing ports for outgoing port indexes.

15. The non-transitory computer readable storage medium of claim 14 wherein the forwarding information further comprises:
a source-group table storing a listing of multicast groups serviced by the processor; and
a session table storing a plurality of session entries, each session entry identifying a multicast group, a source address, a destination address, a protocol type, an incoming port, and a corresponding outgoing port index.

16. The non-transitory computer readable storage medium of claim 13 wherein the instructions that cause the processor to process the router-to-router Layer 3 multicast control message to create forwarding information for use in forwarding multicast content packets comprises instructions that cause the processor to:
determine whether the router-to-router Layer 3 multicast control message is the PIM hello message or the PIM join or PIM prune message; and
if the router-to-router Layer 3 multicast control message is the PIM hello message, create a neighbor list that identifies:
an IP address of a router that sent the PIM hello message; and
an incoming port on which the PIM hello message was received.

17. The non-transitory computer readable storage medium of claim 16 wherein the instructions that cause the processor to process the router-to-router Layer 3 multicast control message to create forwarding information for use in forwarding multicast content packets further comprises instructions that cause the processor to:
if the router-to-router Layer 3 multicast control message is the PIM join or PIM prune message:
determine a multicast mode of operation specified by the PIM join or PIM prune message;
create a first set of forwarding information tables in a forwarding content addressable memory (CAM) if the multicast mode of operation corresponds to an explicit source distribution tree; and
create a second set of forwarding information tables in the forwarding CAM if the multicast mode of operation corresponds to a shared source distribution tree.

18. The non-transitory computer readable storage medium of claim 13 wherein the processor processes the router-to-router Layer 3 multicast control message and creates the forwarding information prior to transmitting the router-to-router Layer 3 multicast control message to its designated destination router.

* * * * *